3,810,958
METHOD OF OBTAINING SMALL PARTICLE SIZE POLYMERS AND COPOLYMERS OF VINYL CHLORIDE BY BULK POLYMERIZATION
Akio Takahashi, Amherst, and Anthony L. Lemper, Tonawanda, N.Y., assignors to Hooker Chemical Corporation, Niagara Falls, N.Y.
No Drawing. Filed May 8, 1972, Ser. No. 251,098
Int. Cl. C08f 3/30, 15/00
U.S. Cl. 260—880 R      6 Claims

ABSTRACT OF THE DISCLOSURE

In a process of bulk polymerization involving two-stage polymerization wherein high speed agitation is used during the first stage and slow speed agitation is used in the second stage, the polymerization in the first stage is conducted in contact with a styrene-butadiene rubber polymer. By the novel polymerization methods, small particle size polyvinyl chloride homopolymers or copolymers are produced which are useful as extender resins in plastisols.

BACKGROUND OF THE INVENTION

Field of the Invention

This invention relates to the production of homopolymers and copolymers of vinyl halide having reduced grain size obtained by the bulk polymerization of the monomer or monomers by a two-stage process, more fully described in British Pat. 1,047,489. Fine grain homopolymers and copolymers having grain size of up to 50 microns and narrow grain size distribution are useful in the preparation of protective, decorative and adhesive coatings based on plastisols in applications where bulk polymerized polymers were previously unsuited because of excessive grain size, irregular shape and wide grain size distribution. Prior art bulk polymerization processes heretofore have produced polymers having an average grain size in the range of 80 to 150 microns. Only by the more costly suspension or emulsion polymerization processes were fine grain size polymers obtainable.

Description of the Prior Art

According to British Pat. 1,047,489, it has been found that raising the speed of agitation during the first stage of polymerization has the effect of increasing the apparent specific gravity and contracting the distribution of grain sizes in the resin finally obtained. However, a compromise must be reached between high speed agitation during polymerization and reduction of the encrustation of the polymerization vessel during the polymerization. Thus, the process described in British 1,047,489 also involves the use of slow speed agitation which is maintained during the second stage of the polymerization process; the agitator passes close to the walls of the polymerization vessel so as to minimize encrustation of the wall with polymer.

In U.S. 3,151,103 a method is shown for reducing the particle size of a vinyl chloride homopolymer or copolymer made using a bulk polymerization technique involving the use of a polymerization vessel containing freely movable indifferent bodies such as balls or rods. One of the methods used in this patent is the incorporation of a fumed silica (silicon dioxide) having a particle size of 0.015 micron which is commercially available under the tradename "Aerosil." The process disclosed provides a 40 percent higher passage through a 0.2 millimeter sieve when 1 percent by weight of fumed silica is incorporated with the vinyl chloride prior to bulk polymerization as compared to the passage through a 0.2 millimeter sieve where no fumed silica is incorporated with the monomer.

In copending application Ser. No. 169,838, filed Aug. 6, 1971, there is disclosed a method of obtaining small particle size polymers and copolymers of vinyl chloride by a bulk process of polymerization involving a two-stage polymerization in which the first stage polymerization is conducted in contact with an organic or inorganic inert fine particle size material, solid at least at reaction temperatures and insoluble in the monomer or monomers used. In addition, anionic, cationic or non-ionic surfactants or mixtures thereof are useful as components to be included in the first stage polymerization. By the method of the invention polymers are produced unexpectedly having substantially smaller particle size.

U.S. 3,562,358 discloses a process for the preparation of vinyl halide polymers exhibiting improved processing characteristics by conventional methods of polymerization including bulk or mass polymerization in which the diene polymer is present during polymerization to the extent of about 0.05 percent to about 0.75 percent based on the weight of the monomer used in the process.

French Pat. No. 1,588,381 relates to a process for the bulk polymerization of vinyl chloride in which the production of curds in the formation of deposits on the polymerization equipment is substantially reduced while polymerizing the vinyl chloride in the presence of an auxiliary polymer which is soluble in monomeric vinyl chloride, said auxiliary polymer being present to the extent of 0.1 to 10 percent by weight on the basis of the monomer and having a solubility parameter between 7.3 and 11.9. The average particle size of the grains of polymeric chloride produced by this process appear to be above 50 microns.

SUMMARY OF THE INVENTION

This invention relates to methods of obtaining small particle size homopolymers and copolymers of vinyl chloride by a bulk polymerization process involving high speed agitation during a first stage in which about 3 to about 15 percent, preferably about 7 to about 12 percent, by weight of the monomer or monomers are converted and polymerized in a second stage involving low speed agitation for the remainder of the reaction. In the process of the invention there is incorporated as an additive in the first stage reaction, a styrene-butadiene rubber which is soluble in the vinyl chloride monomer, so as to obtain a reduction in particle size of the vinyl chloride homopolymer or copolymer produced. By the method of the invention, small particle size polyvinyl chloride homopolymer and copolymer resins are obtained which are comparable in particle size to polymers and copolymers obtained by emulsion or suspension polymerization processes for production of fine particle size polymers.

DESCRIPTION OF THE PREFERRED EMBODIMENTS

Following the method of the invention, 0.01 percent to about 1 percent by weight, preferably about 0.05 to about 0.5 percent by weight, of a styrene-butadiene rubber based upon the monomer or monomers present in the first stage of the vinyl chloride polymerization is added to control polymer particle size. The polymers produced have an average particle size in the range of about 5 microns to 40 microns.

While it is preferred that the monomer composition be comprised totally of vinyl halide monomer, the present invention is also intended to include copolymers formed by the free-radical addition polymerization of a monomer composition containing a predominant amont, e.g., at least 50 percent of vinyl halide and a minor amount, e.g., up to 50 percent by weight of another ethylenically unsaturated monomer material copolymerizable therewith. Preferably, the other ethylenically unsaturated monomer material is used in amounts of less than 25 percent by weight and more preferably in amounts less than 10 percent by weight of the total monomer materials used in preparing the polymer. Suitable ethylenically unsaturated monomer materials which can be used to form copolymers, terpolymers, interpolymers and the like are illustrated by the following monoolefinic hydrocarbons, i.e., monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear or alpha-alkyl or aryl substituted derivatives, e.g., o-, m- or p-methyl, ethyl, propyl or butyl styrene; alpha-methyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates; alkyl methacrylates, e.g., methyl, ethyl, propyl and butyl methacrylate; octyl methacrylate, alkyl crotonates, e.g., octyl; alkyl acrylates, e.g., methyl, ethyl, propyl, butyl, 2-ethyl hexyl, stearyl, hydroxyethyl and tertiary butylamino acrylates, isopropenyl esters, e.g., isopropenyl acetate, isopropenyl propionate, isopropenyl butyrate and isopropenyl isobutyrate, isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, and ethyl alpha-chloroacrylate, alpha-bromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate; maleates, e.g., monomethyl maleate, monoethyl maleate, dimethyl maleate, diethyl maleate; and fumarates, e.g., monomethyl fumarate, monoethyl fuarate, dimethyl fumarate, diethyl fumarate; and diethyl glutaconate; monoolefinically unsaturated organic nitriles including, for example, fumaronitrile, acrylonitrile, methacrylonitriles, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinylpropyl ether, vinyl-n-butyl ether, vinyl isobutyl ether, vinyl 2-ethyl hexyl ether, vinyl 2-chloroethyl ether, vinyl cetyl ether and the like; and vinyl sulfides, e.g., vinyl β-chloroethyl sulfide, vinyl β-ethoxyethyl sulfide and the like can also be included. Diolefinically unsaturated hydrocarbons containing two olefinic groups in conjugated relation and the halogen derivatives thereof, e.g., butadiene-1,3; 2-methyl-butadiene-1,3; 2,3-dimethyl-butadiene-1,3; 2-chloro-butadiene-1,3; 2,3-dichloro-butadiene-1,3; and 2-bromo-butadiene-1,3 and the like.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention is intended to cover all such combinations which fall within the scope of the present invention. While these combinations are intended to be included within the scope of the present invention, it is preferred that the polymer be formed from pure vinyl halide monomer and most preferably pure vinyl chloride.

Styrene-butadiene rubber is an example of a diene copolymer. Other diene copolymers, terpolymers, interpolymers and other multicomponent diene polymers can also be employed in the process of the invention. Preferably, the diene copolymers of butadiene copolymers, for instance, utilizing a diene having four carbon atoms in the main molecular chain and derivatives thereof. Copolymeric diene polymers generally contain at least 50 percent by weight of a diene and preferably from about 55 percent to about 85 percent by weight diene. The styrene-butadiene rubber can contain a wide variety of proportions although generally a 25 to 75 weight percent ratio of styrene to butadiene is used.

Other ethylenically unsaturated monomers which can be utilized to form copolymers are illustrated by vinyl aromatics, such as styrene, methylstyrene, chlorostyrene, 2,3-dichlorostyrene, vinyl naphthalene, vinyl pyridine, ring-substituted styrenes such as ortho-, meta-, or para-methyl or ethyl styrene and also other polymerizable vinyl carboxylic and vinyl halocylic aromatics.

Preferably, a styrene/butadiene copolymer having a 25/75 weight percent ratio is useful in the process of the invention. Molecular weight of the diene copolymers useful in the invention is about 50,000 to about 500,000, weight average molecular weight, preferably about 80,000 to about 200,000 average molecular weight.

The styrene-butadiene rubber can be used in an amount of between about 0.05 percent to about 1.0 percent based on a total weight of monomer in the monomer composition, preferably from about 0.05 percent to about 0.5 percent. The styrene-butadiene rubbers used are characterized in addition as insoluble or partially soluble at normal room temperature and pressure in vinyl chloride monomer. To facilitate solution of the styrene-butadiene rubber, temperatures ranging from 30 to about 60 degrees centigrade can be used in the process.

The free radical bulk polymerization can take place in accordance with the process of the invention at temperatures between 25 and 90 degrees centigrade. The polymerization reaction is conducted in the presence of a free radical initiator. Useful free-radical initiators are organic or inorganic peroxides, persulfates, ozonides, hydroperoxides peracids and percarbonates, azo compounds, diazonium salts, diazotates, peroxysulfonates, trialkyl borane-oxygen systems, and amino oxides. Azobisisobutyronitrile is particularly useful in the present invention. The catalyst is used in concentrations ranging from about 0.01 to about 1.0 percent by weight based on the total weight of the monomers. For use in bulk polymerization, the catalysts which are soluble in the organic phase, such as benzoyl peroxides, diacetyl peroxide, azobisisobutyronitrile or diisopropyl peroxydicarbonate, azobis (alpha-methyl-gamma-carboxybutyronitrile), caprylyl peroxide, lauroyl peroxide, azobisisobutyramidine hydrochloride, t-butyl peroxypivalate, 2,4-dichlorobenzoyl peroxide, azobis, (alpha, gamma-dimethylvaleronitrile), and 2,2' - azobis(2,4 - dimethyl valeronitrile) are generally used. Preferably, the initiator which is used is chosen from a group of initiators known in the prior art as the "hot catalysts" or those which have a high degree of free-radical initiating activity. Initiators with a lower degree of activity are less desirable in that they require longer polymerization times. Also, long polymerization times may cause preliminary product degradation evidenced by color problems, e.g. pinking.

The polymerization products of the present invention can be admixed with various conventional inert additives, such as fillers, dyes, and pigments. In addition, the polymerization products can be admixed with plasticizers, lubricants, thermostabilizers and ultraviolet light stabilizers as desired.

All other conditions and measures of the method of the invention are those conventionally employed in the previously known methods for the bulk polymerization of vinyl chloride involving two stage polymerization as disclosed in British Pat. 1,047,489 and U.S. Pat. 3,522,227, which are incorporated herein by reference. In the following abbreviated description of the process, for the sake of simplicity, the initial stage of the polymerization or copolymerization will be referred to as first stage reaction and the vessel in which this initial stage of polymerization is carried out will be referred to as "Prepolymerizer." The final or complementary stage of the polymerization will be called simply second stage reaction and the vessel in which it is carried out the "Polymerizer."

In the first stage reactor, the means chosen to agitate the monomer or monomers is of a type capable of providing high shear and is commonly referred to as a "radial turbine type" agitator. At the start of the first stage reaction, the Prepolymerizer is charged with a monomer composition to which a catalyst has been added. Any polymerization catalyst generally used in bulk polymerization methods, that is, those hereinabove described can be used to an extent which is usual for bulk polymerization processes. After addition of the vinyl chloride monomer to the first stage reactor, a small amount of monomer is vented in the process of removing the air from the first stage reactor vessel. The agitator tip speed is about 2 to 12 meters per second in the first stage reactor. A tip speed of about 0.5 to about 2 meters per second is used in the second stage reactor. These figures should not be regarded as limiting values. As soon as a conversion of at least about 3 to about 20 percent of the monomer composition has been obtained in the first stage reactor, the contents of the vessel are transferred to a second stage polymerizer vessel equipped to provide slow speed, low shear agitation so as to insure proper temperature control of the reaction medium.

The reaction temperature in both first and second stage reactors generally ranges between about 25 degrees centigrade to about 90 degrees centigrade, preferably about 40 to about 80 degrees centigrade. The reaction pressure in the first stage reactor generally ranges between about 130 pounds per square inch to about 210 pounds per square inch, preferably about 150 to about 190 pounds per square inch. The reaction pressure in the second stage reactor generally ranges between about 80 to about 210 pounds per square inch, preferably between about 90 to about 190 pounds per square inch. The optical microscope and sieve analysis were used as a method of determining average particle size. A magnification of 155 times was used together with an eye piece having a scale graduated in microns to determine the average particle size directly in microns. A 325 mesh screen having openings of 44 microns was used.

The molecular weight of the polymers produced by the process of the invention is comparable to that of polymers presently commercially produced by bulk polymerization which ranges from about 40,000 to about 125,000 by the weight average method. To determine molecular weight, relative solution viscosity, RSV, was measured in tetrahydrofuran at 25° centigrade using a 1 percent resin solution. This is a slight modification from ASTM 1243A wherein a 1 percent resin solution in cyclohexanone is used. The polymers produced varied by this method between 1.6 and 2.7.

In order to further illustrate this invention but without being limited thereto, the following examples are given. In this specification and claims, all parts and percentages are by weight, all pressures are gauge pressures, and all temperatures are in degrees centigrade unless otherwise specified.

EXAMPLE 1—CONTROL

In a vertical-type first stage reactor of 2½ gallon capacity and stainless steel construction, equipped with a radial turbine type agitator were added 0.77 milliliter of a 29 percent solution of acetyl cyclohexane sulfonyl peroxide in dimethyl phthalate sold under the trade mark "Lupersol 228 P" by the Lucidol Division of the Pennwalt Company and 2.5 milliliters of a 40 percent solution of di-2, ethylhexyl peroxy dicarbonate in mineral spirits sold under the trade mark "Lupersol 223 M" by the Lucidol Division of the Pennwalt Company. 13.0 pounds of vinyl chloride were added to the reactor at a temperature of 20 degrees centigrade and 1.5 pounds of the vinyl chloride monomer were vented to the atmosphere to remove air from the reactor. The mixture in the reactor was slowly raised in temperature while agitating using the radial turbine type agitator at a speed of 2,000 revolutions per minute to a temperature of 67 degrees centigrade over a period of 1 hour and maintained at this temperature for a period of 15 minutes at a reaction pressure of 167 pounds per square inch.

The mixture was then transferred to a 5 gallon stainless steel reaction vessel containing 3.9 milliliters of "Lupersol 228 P," 6.3 milliliters of "Lupersol 223 M" and 7.5 pounds of vinyl chloride. 1.5 pounds of vinyl chloride were vented in order to clear the air from the reactor. The mixture was heatel to 50 degrees centigrade and the pressure raised to 105 pounds per square inch. These conditions were maintain over a period of 5 hours. The monomer that has not reacted is blown off and collected in a condensing circuit incorporating a filter so as to separate any particles of polymer carried over. The final traces of residual monomer absorbed by the particles of polymer are eliminated by placing the polymerizer under vacuum twice in succession and changing over to a nitrogen atmosphere in between. All the polymer composition is then passed through screening equipment. In this way, a powdery polymer is obtained in a yield of 63 percent by weight based upon the weight of the monomer available for polymerization. The polymer has an average particle size of 105 microns. The relative viscosity of a 1% solution of this polymer in cyclohexanone was 2.56.

EXAMPLE 2

In a vertical type first stage reactor of 2½ gallon capacity and stainless steel construction, equipped with a radial turbine type agitator were added 10.0 g. of a styrene-butadiene copolymer, the proportion of styrene to butadiene being 25 styrene to 75 butadiene. 1.2 milliliters of a 29 percent solution of acetyl cyclohexane sulfonyl peroxide in dimethyl phthalate sold under the trademark "Lupersol 288 P" by the Lucidol Division of the Pennwalt Company and 3.7 milliliters of a 40 percent solution of di-2, ethyl hexyl peroxy dicarbonate in mineral spirits sold under the trademark "Lupersol 223 M" by the Lucidol Division of the Pennwalt Company. 13.0 pounds of vinyl chloride were added to the reactor at a temperature of 20 degrees centigrade and 1.5 pounds of the vinyl chloride monomer were vented to the atmosphere to remove air from the reactor. The mixture in the reactor was slowly raised in temperature while agitating using a radial turbine type agitator at a speed of 2,000 revolutions per minute to a temperature of 67 degrees centigrade over a period of 1 hour and maintained at this temperature for a period of 25 minutes at a reaction pressure of 167 pounds per square inch.

The mixture was then transferred to a 5 gallon stainless steel reaction vessel containing 3.9 milliliters of "Lupersol 228 P," 6.3 milliliters of "Lupersol 223 M" and 7.5 pounds of vinyl chloride. 1.5 pounds of vinyl chloride were vented in order to clear the air from the reactor. The mixture was heated to 50 degrees centigrade and the pressure raised to 105 pounds per square inch. These conditions were maintained over a period of 4.5 hours, then the mixture was heated to obtain a pressure of 170 p.s.i.g. over a period of 1.0 hour. The monomer that has not reacted is blown off and collected in a condensing circuit, incorporating a filter so as to separate any particles of polymer carried over. The final traces of residual monomer absorbed by the particles of polymer are eliminated by placing the polymerizer under vacuum twice in succession and changing over to a nitrogen atmosphere in between. All the polymer composition is then passed through screening equipment. In this way a powdery polymer is obtained in a yield of 88 percent by weight based upon the weight of the monomer available for polymerization. The product thus produced contained some graft copolymer of vinyl chloride and the styrene butadiene copolymer. The polymer has an average particle size of 31 microns. The relative viscosity of a 1 percent solution of this polymer in cyclohexanone was 2.10.

Various modifications can be made in the invention without departing from the spirit thereof. Therefore, the foregoing specification is intended to illustrate the invention but not to limit it.

What is claimed is:

1. In a process for the preparation of vinyl halide polymer by bulk polymerization of a vinyl halide monomer wherein polymerization is carried out in a first stage during which a reaction mixture is subjected to high speed agitation until about 3 percent to about 15 percent of said monomer has been converted to polymer, and in which said polymerization is completed in a second stage during which said reaction mixture is subjected to low speed agitation until the reaction has been completed, the improvement which comprises carrying out said polymerization of said monomer in said first stage in the presence of a styrene-butadiene rubber to produce a polymer product having small particle size.

2. A process of claim 1 wherein said styrene-butadiene rubber is present in an amount from about 0.05 to about 0.5 percent by weight of said monomer.

3. The process of claim 2 wherein said styrene-butadiene rubber has a molecular weight of from about 50,000 to about 500,000 weight average molecular weight and said polymer product has an average particle size of about 5 to 40 microns.

4. The process of claim 1 wherein said styrene-butadiene polymer has a weight percent ratio of styrene to butadiene of 25 to 75 and a molecular weight of about 50,000 to about 500,000 weight average molecular weight.

5. The process of claim 1 wherein said vinyl halide is vinyl chloride.

6. In a process for the preparation of a vinyl chloride polymer by bulk polymerization of vinyl chloride monomer wherein polymerization is carried out in a first stage during which a reaction mixture is subjected to high speed agitation until about 3 percent to about 15 percent of said monomer has been converted to polymer and in which said polymerization is completed in a second stage during which said reaction mixture is subjected to low speed agitation until the reaction has been completed, the improvement which comprises carrying out said polymerization of said monomer in said first stage in the presence of a styrene-butadiene rubber to produce a polymer product having small particle size, wherein said styrene-butadiene rubber is present in an amount of from about 0.05 to about 0.5 percent by weight of said monomer, has a molecular weight of about 50,000 to about 500,000 weight average molecular weight, and a weight percent ratio of styrene to butadiene of 25 to 75 and wherein said vinyl chloride polymer has an average particle size of about 5 to 40 microns.

References Cited

UNITED STATES PATENTS 3,663,657   5/1972   Sturt   260—878 R
3,488,744   1/1970   Nemphos et al.   260—880 R JOSEPH L. SCHOFER, Primary Examiner A. HOLLER, Assistant Examiner U.S. Cl. X.R.

260—92.8 R